United States Patent [19]
Krogmann

[11] Patent Number: 5,710,559
[45] Date of Patent: Jan. 20, 1998

[54] FLIGHT SAFETY MONITORING DEVICE FOR AIRCRAFT WITH ALARM

[75] Inventor: Uwe Krogmann, Überlingen, Germany

[73] Assignee: Bodenseewerk Geratetechnik GmbH, Germany

[21] Appl. No.: 401,960

[22] Filed: Mar. 10, 1995

[30] Foreign Application Priority Data

Mar. 28, 1994 [DE] Germany ................... 44 10 709.9

[51] Int. Cl.$^6$ ................................................. G08B 23/00
[52] U.S. Cl. ....................... 340/963; 340/945; 340/439; 364/424.06; 395/23
[58] Field of Search ........................ 340/945, 963, 340/961, 970, 439; 364/424.06, 439; 395/21, 22, 23

[56] References Cited

U.S. PATENT DOCUMENTS

| | | | |
|---|---|---|---|
| 4,827,418 | 5/1989 | Gerstenfeld | 364/439 |
| 4,916,448 | 4/1990 | Thor | 340/963 |
| 5,057,834 | 10/1991 | Nordstrom | 340/945 |
| 5,179,624 | 1/1993 | Amano et al. | 395/21 |
| 5,243,339 | 9/1993 | Graham et al. | 340/945 |
| 5,260,874 | 11/1993 | Berner et al. | 364/424.06 |
| 5,325,302 | 6/1994 | Izidon et al. | 364/424.06 |
| 5,396,580 | 3/1995 | Fu | 395/21 |
| 5,521,580 | 5/1996 | Kaneko et al. | 340/439 |
| 5,541,590 | 7/1996 | Nishio | 395/23 |

FOREIGN PATENT DOCUMENTS

| | | |
|---|---|---|
| 0 200 352 | 3/1985 | European Pat. Off. . |
| 0 416 370 A3 | 8/1990 | European Pat. Off. . |

OTHER PUBLICATIONS

W. Shaneyfelf, Scientific Honeyweller, Summer 1988, pp. 43–49.

Krishna Kumar and Sawhney, "1991 IEEE Conference Proceedings", vol. 3, pp. 1511–1516.

Smith, Walters, Goodson and Stites, "1991 IEEE Conference Proceedings", vol. 3, pp. 1545–1550.

*Primary Examiner*—Brent A. Swarthout
*Attorney, Agent, or Firm*—Lee, Mann, Smith, McWilliams, Sweeney & Ohlson

[57] ABSTRACT

For monitoring flight safety of aircraft, a monitoring device accommodated in a pod is provided. The monitoring device has a monitoring unit to be attached to an aircraft. Sensors for measuring aircraft data independently of the sensors of the aircraft itself are provided in the monitoring unit. There is a device for automatically monitoring the operation of the technical equipment of the monitoring unit. In addition, the monitoring unit contains a system for automatically monitoring the pilot's reactions on the basis of aircraft data provided by the independent sensors. Furthermore, the monitoring unit contains a device which responds to deviations of the aircraft from the range of safe flight states. This device triggers an alarm. There is a device responding to the aircraft inadmissibly approaching ground and a collision warning device, which responds to the risk of collision with other aircraft. Also these devices trigger an alarm in the case of danger.

11 Claims, 5 Drawing Sheets

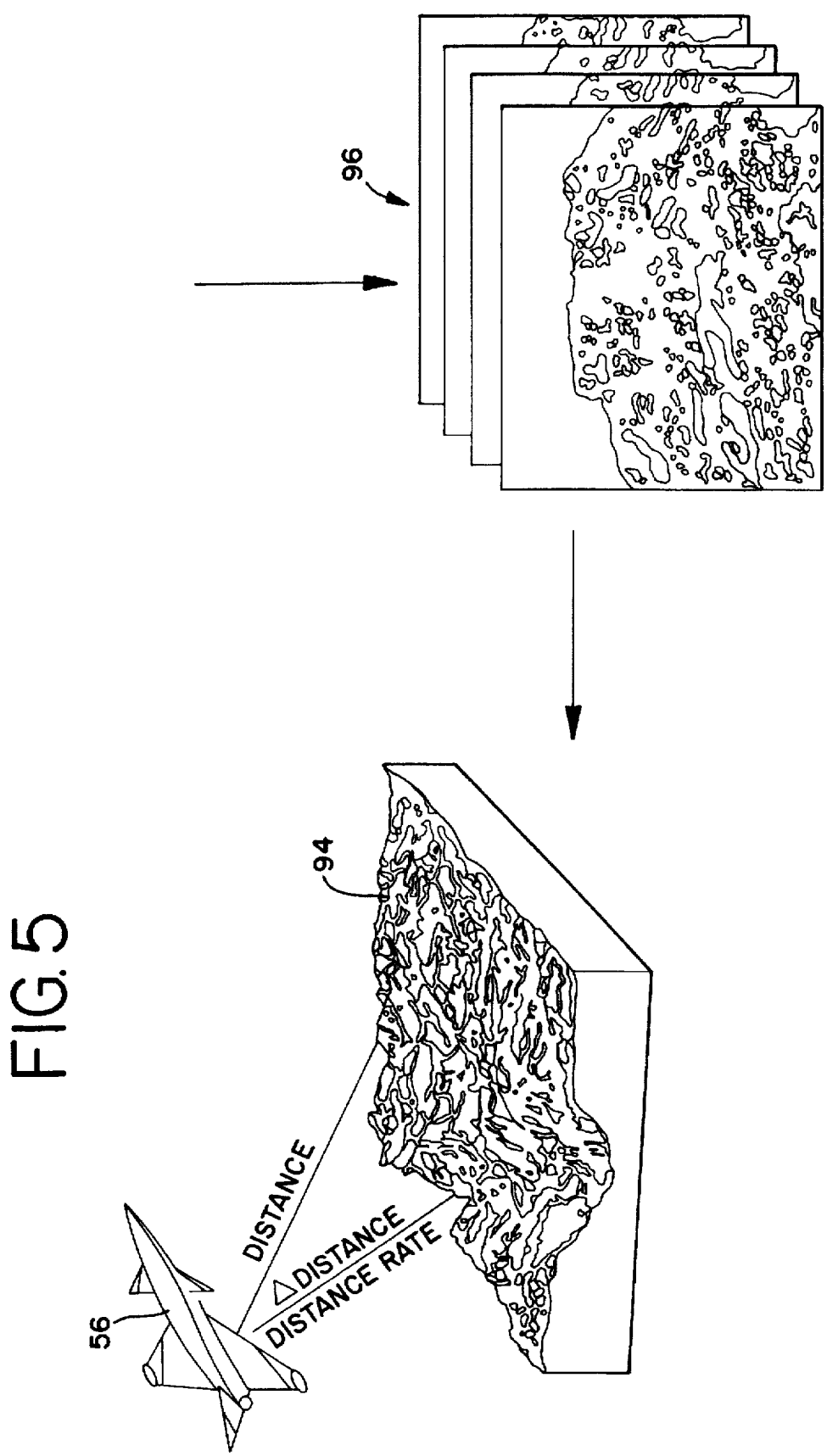

FLIGHT SAFETY MONITORING DEVICE FOR AIRCRAFT WITH ALARM

BACKGROUND OF INVENTION

The invention relates to a monitoring device for monitoring flight safety of aircraft.

Modern aircraft are very complex systems comprising a multitude of components which cooperate in a variety of ways. Therefore, great demands are made on the pilot, if he is to govern all these complex systems. The failure of a component or unit, for example of a sensor, can lead to dangerous reactions. The same may, however, also be true for a false reaction by the pilot.

It is well known, to provide sensors used in the aircraft, signal processing channels and servomotors redundantly. By appropriate redundancy management, care can be taken that even, if a sensor fails, the information required for the stabilization, steering and navigation of the aircraft is still provided by the system. An example of such redundancy management is shown in U.S. Pat. No. 4,914,598, issued Apr. 3, 1990 to Uwe Krogmann and Jürgen Bessel. The prior art systems provide redundant sensors in the aircraft itself.

Prior art systems do not contain measures for monitoring the human pilot.

SUMMARY OF THE INVENTION

It is an object of the invention to provide a monitoring device which continuously monitors the human pilot, during a flight mission.

In particular, such continuous monitoring is to take place during instruction and trainings flights.

According to the invention these objects are achieved by a monitoring unit adapted to be attached to the aircraft and containing technical equipment, said technical equipment including sensor means for measuring aircraft data independently of aircraft sensors, means for automatically monitoring the operation of said technical equipment of said monitoring unit, and means for automatically monitoring the pilot's reactions on the basis of said aircraft data provided by said independent sensor means, said reaction monitoring means being also mounted in said monitoring unit.

Thus a monitoring device is provided, which continuously monitors both its own technical equipment, and the human pilot. The human pilot is a very important link in the overall system.

The monitoring unit provides the aircraft data by means of sensors independent of the sensors of the aircraft itself. Therefore, it is not necessary to interfere, in any way, with the sensor and flight control system of the aircraft. This would not be permissible.

The monitoring unit may contain warning means, to which aircraft data from said independent sensors are applied and which is designed to respond to deviations from safe flight states of the aircraft by providing a warning signal.

Furthermore, the monitoring unit may contain ground contact warning means to which aircraft data from said independent sensors are applied and which is designed to respond to inadmissibly close approach of the aircraft to the ground by providing a warning signal. Eventually the monitoring unit may contain collision warning means which is designed to respond to the danger of collision with other aircraft by providing a warning signal.

Thus the monitoring device, at first, checks the operation of its own technical equipment, then the reaction of the pilot and, eventually, can detect and signal, on this basis, deviations from the range of safe flight states and the danger of ground contact.

The means for monitoring the technical equipment may comprise an associative neural network having inputs and outputs, and a rule-based expert system connected to said neural network outputs, said expert system being designed to provide, as output information thereof, information about the situation and a decision about measures to be taken. The rule-based expert system may be an associative memory operating with fuzzy logic.

The means for monitoring the pilot may comprise a neural network with weights which, in an initial state, has been trained to model the behavior of a generic pilot as reaction to sensor signals. This neural network is arranged, in operation, to receive sensor signals indicative of the state of the aircraft from said independent sensor means and signals which represent the reactions of a real, human pilot. Thereby the neural network is re-trained during a training process from its initial state to a state with changed weights, whereby its behavior approximates the behavior of the real human pilot. An adaptive knowledge and data base containing rules is provided, which stores in a memory rules codifying, in an if-then form, the behavior of a pilot as response to sensor signals from said independent sensor means. The rules are provided with weights which represent the importance of the rules for the pilot's behavior. There are means for applying said sensor signals from said independent sensor means to said knowledge and data base, and means for changing the weights of the knowledge and data base step-by-step depending on changes of the weights of the neural network relative to its initial state. Evaluating means form a measure of the pilot's flying ability from the changed weights of the rules in the knowledge and data base. The adaptive knowledge and data base is an associative memory operating with fuzzy logic.

The monitoring device, in addition, may comprise a computer model of the aircraft dynamics, commands from the pilot being applied both to the aircraft and to said model, said computer model providing estimated state variables of the aircraft; said estimated state variables of the aircraft being also applied to said evaluating means. This permits taking into consideration, in the evaluation, unusual reactions by the pilot, which may be caused by unusual flight behavior of the aircraft, for example due to a defect. In this case, the actual behavior of the aircraft deviates from the behavior of the model. The computer model may be a neural network which has been trained on the basis of commands given by the pilot and measured state variables of the aircraft.

The monitoring unit and said independent sensor means may be accommodated in a pod adapted to be attached to the aircraft.

An embodiment of the invention is described in greater detail hereinbelow with reference to the accompanying drawings.

BRIEF DESCRIPTION OF THE DRAWINGS

FIG. 5 illustrates the monitoring of the danger of collision between aircraft and ground.

DESCRIPTION OF A PREFERRED EMBODIMENT OF THE INVENTION

Figure 1:
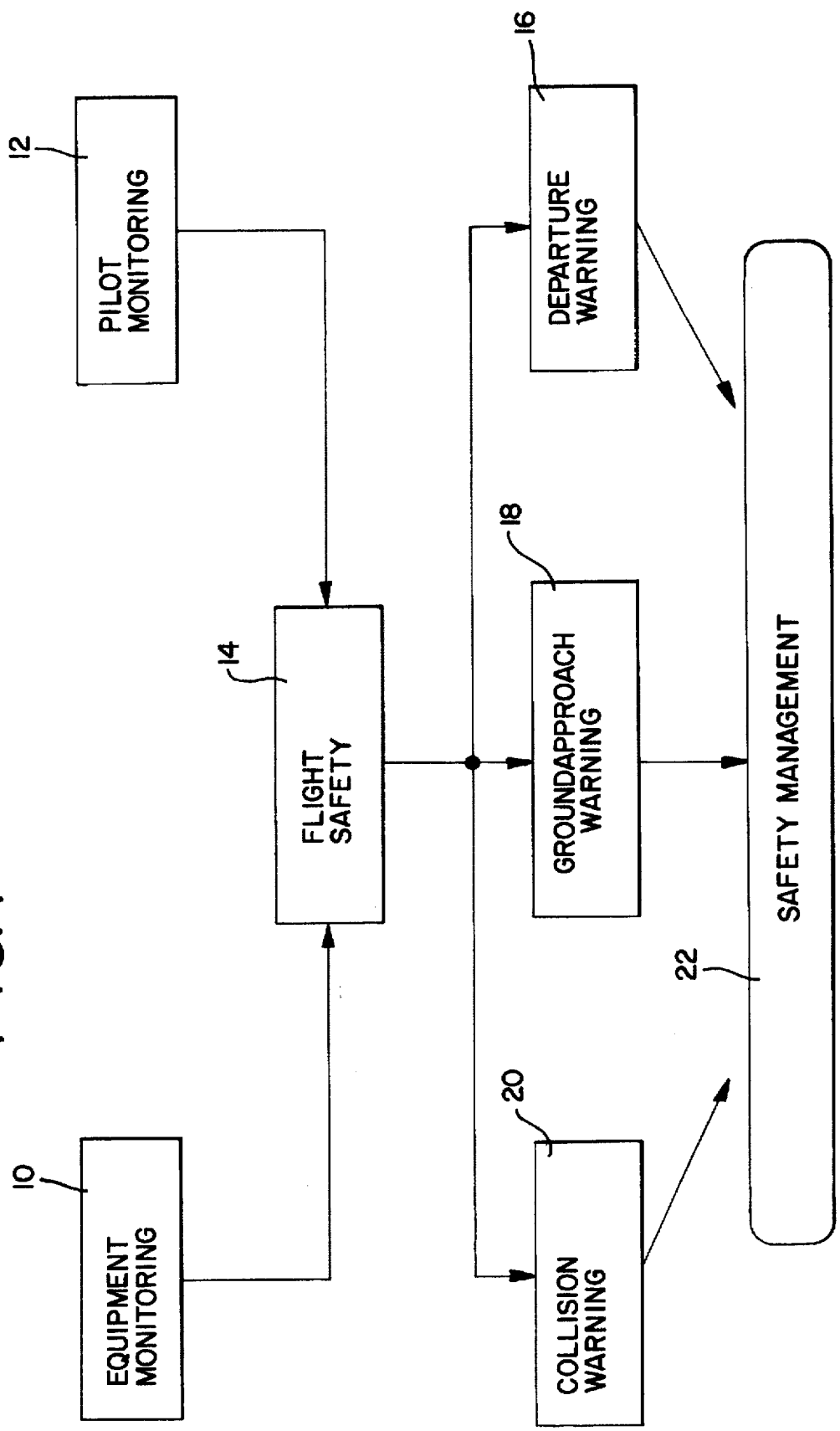
FIG. 1 is a diagram illustrating the safety concept on which the invention is based.

Referring to FIG. 1, block 10 represents the monitoring of the equipment. The block 12 symbolizes the monitoring of the pilot. This will be described hereinbelow. From the two monitoring steps, results monitoring of flight safety. This is illustrated by block 14 in FIG. 1.

On the basis of this monitoring, further points of danger are watched: Block 16 provides a warning, if the aircraft deviates from the range of safe flight states. Block 18 provides a warning, if the aircraft approaches ground dangerously. Block 20 symbolizes the generation of a collision warning signal, if there is the risk of collision with another aircraft.

Altogether, a "safety management" of the whole system is achieved thereby, as indicated by block 22 in FIG. 1.

Figure 2:
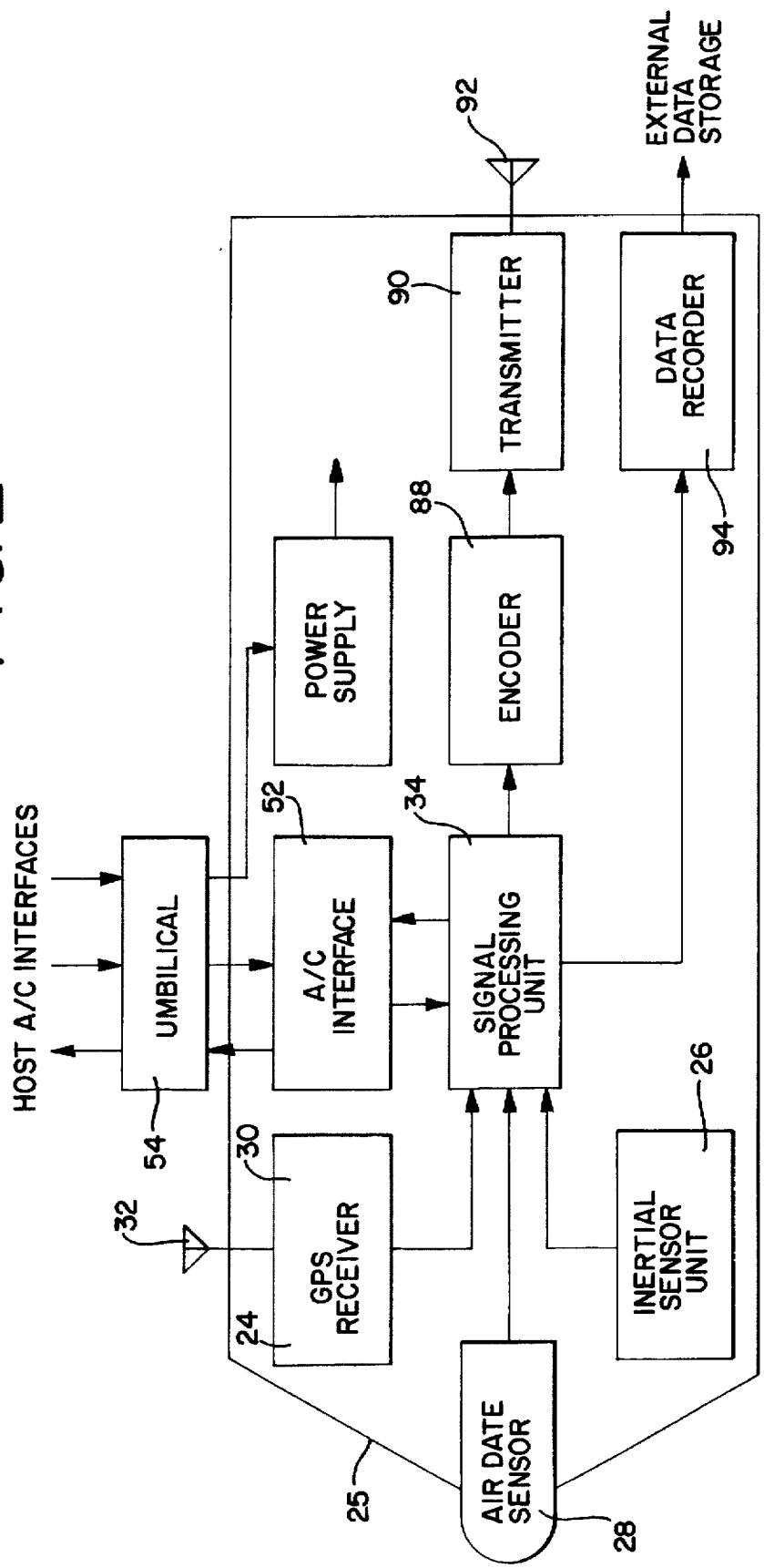
FIG. 2 illustrates schematically a monitoring unit accommodated in a pod to be attached to an aircraft.

FIG. 2 schematically shows a monitoring unit 24, which is suspended as a pod from a fighter aircraft. The pod has the shape and the weight of a missile, as conventionally suspended from the wings of the fighter aircraft. This offers the advantage that the aerodynamics of the aircraft do not change in comparison with the conventional operation. If the aircraft is licenced for operation with such missiles, this licence will remain valid, if a pod 25 is attached instead of the missile.

The monitoring unit 24 contains sensors with associated signal processing means which redundantly detect and process the aircraft data such as attitude, air data and position. The sensors include an inertial sensor unit 26, an air data sensor 28 and a receiver 30 for the satellite navigation (GPS) with the associated antenna 32. The inertial sensor unit 26 contains gyros and accelerometers. If necessary, additional sensors, for example a Doppler radar or an altimeter, may be provided. The sensors 26, 28 and 30 are independent of the sensors of the aircraft itself. Therefore, no interference with the sensor system of the aircraft itself is required. The monitoring device is capable to determine the aircraft data, for example the position, attitude and airspeed or angle of attack, independently of the sensors and instruments of the aircraft itself. The data from the sensors 26, 28 and 30 are applied to a signal processing unit 34. The signal processing unit 34 provides the required aircraft data from the sensor signals. These aircraft data are generated redundantly. For example, the position can be obtained once from the inertial sensor unit 26 by signal processing in the signal processing unit 34 in accordance with the methods of inertial navigation, or from the receiver 30 for the satellite navigation with corresponding signal processing. By appropriate redundancy management, it is ensured that, if a sensor fails, the required information is obtained from the remaining sensors by re-configuration.

Figure 3:
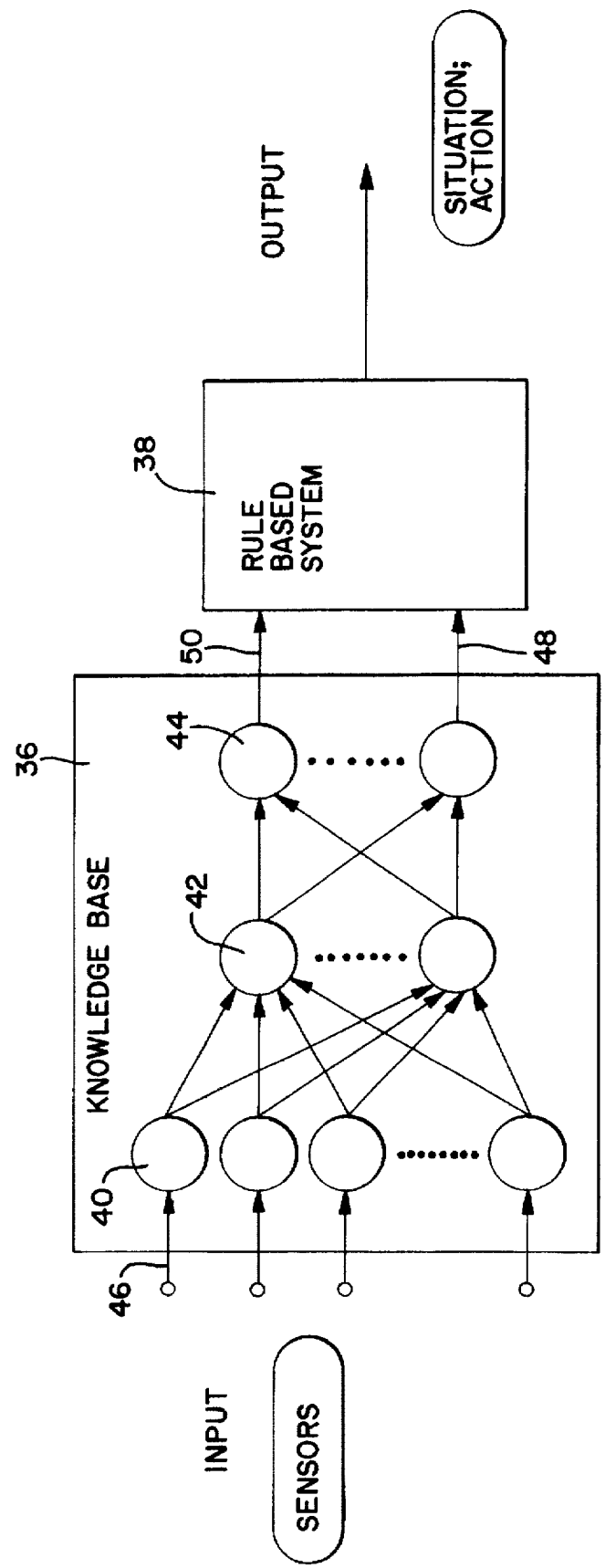
FIG. 3 illustrates the structure of a monitoring element for monitoring sensors, in a monitoring device of the present type.

In the present case, the monitoring of the "technical equipment" is effected by a neural network 36 in combination with a rule-based expert system 38, as illustrated in FIG. 3.

The neural network 36 is a three-layer network with an input layer 40, a hidden layer 42 and an output layer 44. Input data from the sensors are applied to the input layer 40 through inputs 46. Outputs 48 indicate, whether a sensor is defective and which sensor is defective. The neural network 36 is trained to this effect by controlled learning, the connecting weights having been set during this learning process. The activities of the nodal points in the hidden layer 42 represent the classes of possible failures, errors or system defects. The activities of the nodal points in the output layer represent classes of proposed modes of procedure. The rule-based expert system, which is an associative memory operating with fuzzy logic, eventually generates, at its outputs, decisions about the measures to be taken.

For example, the device of FIG. 3 may operate in such a way that measuring data from all sensors are applied to the inputs of the neural network 36. The neural network 36 provides a signal of substantially "H" (high) at the first output, if one sensor, for example the receiver for satellite navigation, fails. All other outputs are substantially "L" (low). The expression "substantially" means here, that the outputs of the neural network do not provide well defined voltage values or data but are slightly fuzzy. The rule-based expert system 38 now contains stored rules, usually in the form of "if . . . , then . . . ". In the present, simplified, case, the expert system might apply the stored rule: "If output 50 is "high" (GPS-receiver defective) and all other outputs are "low", then position is to be determined from inertial navigation alone". This is the re-configuration. In the present case, "High" and "Low" are fuzzy quantities, which are processed by the fuzzy logic of the associative memory.

The described monitoring device for the technical equipment form part of the signal processing unit 34 in FIG. 2. The monitoring unit of FIG. 3 fulfills the function of the block 10 in FIG. 1.

The signal processing unit 34 is connected to the data bus of the aircraft through an interface 52 and an umbilical 54. Through this connection, the signal processing unit 34 receives the control commands given by the pilot of the aircraft. The signal processing unit 34 comprises a monitoring device for monitoring the pilot. Such a monitoring device is illustrated in FIG. 4.

Figure 4:
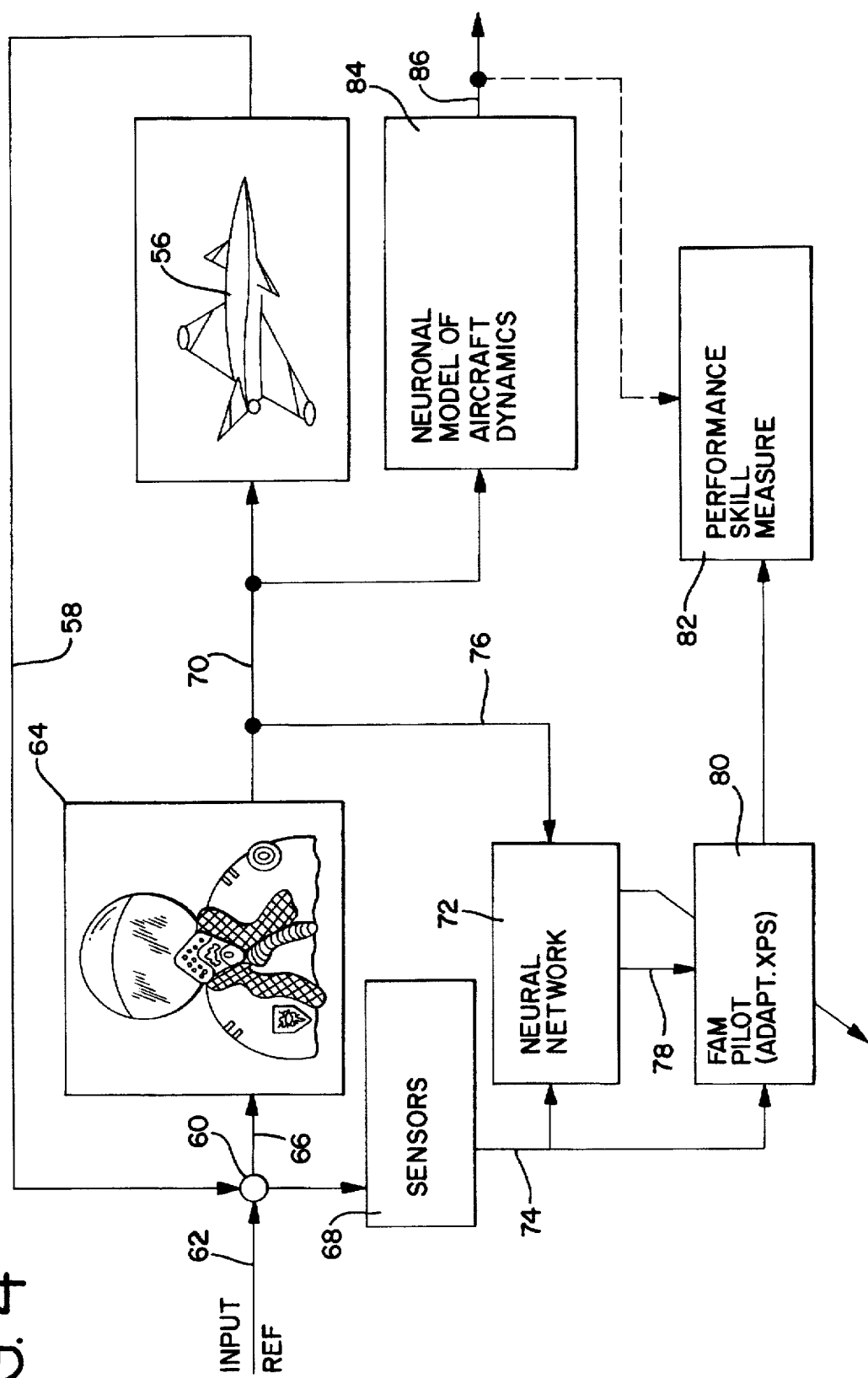
FIG. 4 is a block diagram of a monitoring device for monitoring the pilot.

In principle, the monitoring device of FIG. 4 has similar structure as the monitoring device for the technical equipment, which is illustrated in FIG. 3. Input quantities are quantities such as attitude, air data and position, which result from the behavior of the aircraft 56. These quantities are "fed back" to the input of the monitoring device through a loop 58, and are compared, if necessary, with a reference 62 at a summing point 60. These input quantities are, on one hand, detected by the pilot 64. This can be done by reading instruments by visual observation or by sensing accelerations. This is illustrated by arrow 66 in FIG. 4. On the other hand, the relevant quantities are measured by the aircraft-independent sensors 26, 28 and 30 in the pod 24. This is shown by block 68 in FIG. 4. The pilot's reactions on the perceived input quantities (arrow 66) are picked off from the data bus 70 of the aircraft through the umbilical 54 and are applied to the data processing unit 34.

The data processing unit 34 comprises a neural network 72. Once, the signals from the sensors 26, 28 and 30 (and, if applicable, of other sensors represented by block 68) are applied to this neural network 72. This is shown by the connection 74. In addition, the neural network 72 receives information about the pilot's reactions from the data bus of the aircraft through the umbilical 54 and the interface 52 (FIG. 2). This is illustrated by the connection 76 in FIG. 4. The output 78 of the neural network 72 is, again, applied to a rule-based expert system 80. The neural network 72 and the rule-based expert system have, in principle, the same structure as the neural network 36 and expert system 38 of FIG. 3.

The neural network 72, by training, has acquired the abilities of a "good" pilot and represents a "generic pilot".

The neural network 72 relates the relative reaction of the aircraft as detected by the sensors 68 with the reaction of the pilot 64. This is indicated by the arrows pointing to the neural network 72. Starting from the original level of training of the neural network 72, this neural network 72 is "re-trained" by the sensor signals and the human pilot's reactions thereon, whereby it approximates the behavior of the real human pilot.

The knowledge and data base 80 contains rules for the pilot's behavior, so to say a "pilot's manual". The rules have the form of "if . . . , then . . . ". "If these and those sensor signals occur, then the pilot has to take this and that action". The rules have weights. These weights depend on how strictly the pilot has to follow and, in practice, follows the respective rule.

When the neural network 72 has changed starting from the original level of training of the neural network and, thereby, the neural network 72 approximates the behavior of the real human pilot, the weights of the rules in the knowledge and data base 80 are changed simultaneously step-by-step. This is illustrated by the arrow crossing the block, which represents this knowledge and data base in FIG. 4. If, for example, the pilot repeatedly disregards a particular rule, the "weight" of this rule in the system of rules in the knowledge and data base 80 is reduced relative to the initial state. Thus the changes of the weights of the various rules provide a measure of the pilot's ability. Forming this measure is represented by block 82 labelled "evaluation unit".

Using the neural network 72, which, as its initial state, is trained by the behavior of a good pilot, offers the advantage that, by the training process with the real pilot, a final state can be reached very quickly in which the weights of the neural network 72 change only insignificantly during further training. With an initial state in which the weights of the neural network 72 are distributed at random, it would take too much time to train the neural network. It can be assumed that the behavior of the pilot to be tested is not basically different from that of a "good" generic pilot. It is easier to match the neural network representing the generic pilot with some other human pilot than to match therewith an untrained neural network, which would, so to say, represent a layman.

The neural network 72 alone would not provide a quantitative measure of the pilot's ability. Also it would not permit conclusions about which mistakes the pilot 64 makes, i.e. in what respect the behavior of the pilot 64 deviates from that of a "generic pilot".

Therefore, the weights of the neural network are converted into weights of well-defined rules as indicated in FIG. 4.

Rules of the knowledge and data base 80 may be varied by the change of the weights of the neural network. It is also possible that new rules will be created. It is known which quantities are linked with each other through the weights of the neural network. A program looks for relations of the form that certain inputs (sensor signals) are linked to a certain output (pilot's reaction) with particularly large weights. Such large weights mean that, when the sensor signals associated with the inputs occur, the pilot particularly often reacts in accordance with the output (or a plurality of outputs). Such relations can be formulated as an "if . . . , then . . ."-rule. The program examines, whether the new rule is already contained in the knowledge and data base 80. If this is not the case, the new rule will be stored in the knowledge and data base 80.

The neural network 72 provides output signals at an output 78 indicating to which extent the actual reactions of the pilot 64 deviate from those of the generic pilot. If the airspeed is reduced to below a setpoint value, the reduction being indicated by the air data sensor 28, the thrust would, for example, have to be increased or the climbing angle would have to be reduced. However different pilots will react on a given situation in slightly different ways. Therefore, the grading criteria are fuzzy. Linguistic criteria such as "good conformity", "reasonable conformity" and "poor conformity" will be used for the various reactions.

The knowledge and data base 80 also receives the signals from the sensors 68. Therefore, the knowledge and data base "knows" the aircraft states. The knowledge and data base 80 receives, from the neural network 72 grading criteria, which merely are directed to the degree of conformity between the actual human pilot 64 and a "generic" pilot. However the tolerances which exist for the pilot's behavior are differently large for the various reactions. These tolerances often depend on the aircraft state. A pilot, which, upon a deviation of the airspeed measured by air data sensor 28 from a setpoint value, does not increase the thrust at once, may react quite reasonable in one case, when the airspeed is well above the stall speed and the drop of the measured airspeed is due only to a temporary gust. In other cases, even a slight deviation from the "standard" may become critical. There may be different reasonable reactions in still other situations. All these points of view are taken into consideration by rules in the knowledge and data base, which incorporate both the criteria from the neural network 72 and the sensor signals from the sensors 68.

The knowledge and data base 80 is an associative memory operating with fuzzy logic.

Depending on the grading criteria received from neural network 72 through output 78, the weights of the rules stored in the knowledge and data base 80 are changed step-by-step. These changes provide "grades" for the various aspects of the pilot training. These "grades" are also of linguistic nature such as "reactions quick", "reactions normal" or "reactions slow" etc. From these linguistic "grades" provided by the knowledge and data base 80, the evaluation unit 82 provides a measure of the pilot's training level.

This method monitors both the pilot's subconscious behavior and deliberate actions.

It may be, that the aircraft requires from the pilot sometimes a behavior which deviates from the standard. This may, for example, be due to the fact, that the aerodynamics of the aircraft has changed, or an engine has failed. In order to recognize this, a computer model 84 of the aircraft dynamics is provided. This model 84 of the aircraft dynamics receives the same commands from the data bus 70 as the aircraft 56 itself. The model 84 provides estimated values of the aircraft states at an output 86. These estimated values presume an intact aircraft. The estimated values are applied to the evaluation unit. Then the evaluation unit recognizes deviations of the real behavior of the aircraft, as detected by the sensors 68, and the estimated values. The computer model of the aircraft, which is highly non-linear, is provided by a neural network. This neural network has been trained on the basis of the behavior of a real aircraft.

The data provided by the signal processing unit 34 are coded by a coder 88 and are transmitted by a transmitter 90 with antenna 92. This is true also for data which are provided by various sensors. The data are also applied to a data recording apparatus 93 and may be transferred by this data recording apparatus to an external memory.

With the thus monitored data from the various sensors, independent of the sensors of the aircraft, the aircraft is monitored to ensure that the flight states are within a safe range. To this end, the pod 24 contains a device, to which the aircraft data from the independent sensors 26, 28, 30 are applied and which responds to deviations of the aircraft from the range of safe and triggers an alarm. This is the function illustrated in FIG. 1 by block 16.

Critical, in particular during airfight training, is the risk of a collision between the aircraft involved. In order to avoid such collisions, all aircraft involved are provided with a pod of the type described. Each of these pods 25 contains a sensor for the satellite navigation. This satellite navigation permits determination of the position of an aircraft with an accuracy of a few meters. The inertial sensor unit provides the velocity vector in space, i.e. virtually the velocity over ground. The data of the various aircraft are broadcast through transmitters 90 and the antenna 92 and are transmitted wireless to all other aircraft involved. Therefore, each monitoring unit 24 receives not only information with respect to its own position, flight direction and flight speed but also the corresponding data of all other aircraft involved. The signal processing unit can calculate, from this information, whether for two of the aircraft involved there is a risk of collision. Such a risk exists, if the aircraft fly on a collision course, thus if the aircraft with the measured flight speeds and flight directions, starting from the present positions, would reach the same point in space or a certain area at the same time, and if the distance between the aircraft has decreased below a certain value. In this case, an acoustic alarm signal is given to the pilot by the monitoring device. This is the function illustrated by block 20 in FIG. 1.

Furthermore, the monitoring unit in the pod 25 contains a device to which the aircraft data from the independent sensors are applied and which responds to the aircraft inadmissibly approaching ground and triggers an alarm. This device assumes that the training takes place above known terrain 95 (FIG. 5). The terrain structure of this terrain 94 is stored in a memory 96, as schematically illustrated in FIG. 5. The position of the aircraft 56 in space is known from the receiver 30 for the satellite navigation. Therefrom the position of the aircraft relative to the terrain 94 can be determined. In addition, the inertial sensor unit 26 provides the velocity vector of the aircraft over ground. The signal processing unit 34 can calculate therefrom, whether there is a risk of ground contact, and can trigger an alarm. This is the function illustrated by block 18 in FIG. 1.

I claim:

1. A monitoring device for monitoring flight safety of an aircraft containing sensors for aircraft data, comprising:
    (a) a monitoring unit (24) adapted to be attached to the aircraft and containing technical equipment;
    (b) said technical equipment including sensor means (26,28,30) for measuring said aircraft data independently of said aircraft sensors;
    (c) means (36,38) for automatically monitoring the operability of said technical equipment of said monitoring unit (24);
    (d) means (36,38) for automatically monitoring the pilot's reactions (64) on the basis of said aircraft data provided by said independent sensor means (26,28,30), said reaction monitoring means (36,38) being also mounted in said monitoring unit; and
    (e) means for evaluating said monitored reactions to form a measure of the pilot's flying ability thereby indicating whether monitored reactions to particular sensed aircraft data conformed with expected reactions.

2. A monitoring device as claimed in claim 1, wherein said monitoring unit (24) contains warning means, to which aircraft data from said independent sensors are applied and which is designed to respond to deviations from safe flight states of the aircraft by providing a warning signal.

3. A monitoring device as claimed in claim 1, wherein said monitoring unit (24) contains ground contact warning means to which aircraft data from said independent sensors are applied and which is designed to respond to inadmissibly close approach of the aircraft to the ground by providing a warning signal.

4. A monitoring device as claimed in claim 1, wherein said monitoring unit (24) contains collision warning means which is designed to respond to the danger of collision with other aircraft by providing a warning signal.

5. A monitoring device as claimed in claim 1, wherein said equipment monitoring means comprises an associative neural network (36) having inputs and outputs, and a rule-based expert system (38) connected to said neural network outputs, said expert system (38) being designed to provide, as output information thereof, information about the flight safety of the aircraft and a decision about measures to be taken.

6. A monitoring device as claimed in claim 5, wherein said rule-based expert system (38) is an associative memory operating with fuzzy logic.

7. A monitoring device as claimed in claim 1, wherein said means (64) for monitoring the pilot's reactions comprise:
    (a) a neural network with weights which
        in an initial state has been trained to model the behavior of a generic pilot as reaction to sensor signals, and
        is arranged, in operation, to receive sensor signals indicative of the state of the aircraft from said independent sensor means and signals which represent the reactions of a real, human pilot, whereby the neural network is re-trained during a training process from its initial state to a state with changed weights, whereby its behavior approximates the behavior of the real human pilot,
    (b) an adaptive knowledge and data base containing rules which
        stores in a memory rules codifying, in an if-then form, the behavior of a pilot as response to sensor signals from said independent sensor means,
        said rules being provided with weights which represent the importance of the rules for the pilot's behavior,
    (c) means for applying said sensor signals from said independent sensor means to said knowledge and data base,
    (d) means for changing the weights of the knowledge and data base step-by-step depending on changes of the weights of the neural network relative to its initial state, and
    (e) evaluating means for forming a measure of the pilot's flying ability from the changed weights of the rules in the knowledge and data base.

8. A monitoring device as claimed in claim 7, wherein said adaptive knowledge and data base is an associative memory operating with fuzzy logic.

9. A monitoring device as claimed in claim 7, and further comprising a computer model (84) of the aircraft dynamics, commands from the pilot being applied both to the aircraft and to said model, said computer model (84) providing estimated state variables of the aircraft; said estimated state variables of the aircraft being also applied to said evaluating means.

10. A monitoring device as claimed in claim 9 wherein said computer model (84) is a neural network which has been trained on the basis of commands given by the pilot and measured state variables of the aircraft.

11. A monitoring device as claimed in claim 1, wherein said monitoring unit (24) and said independent sensor means (26,28,30) are accommodated in a pod (25) adapted to be attached to the aircraft (56).

* * * * *